United States Patent Office 2,799,931
Patented July 23, 1957

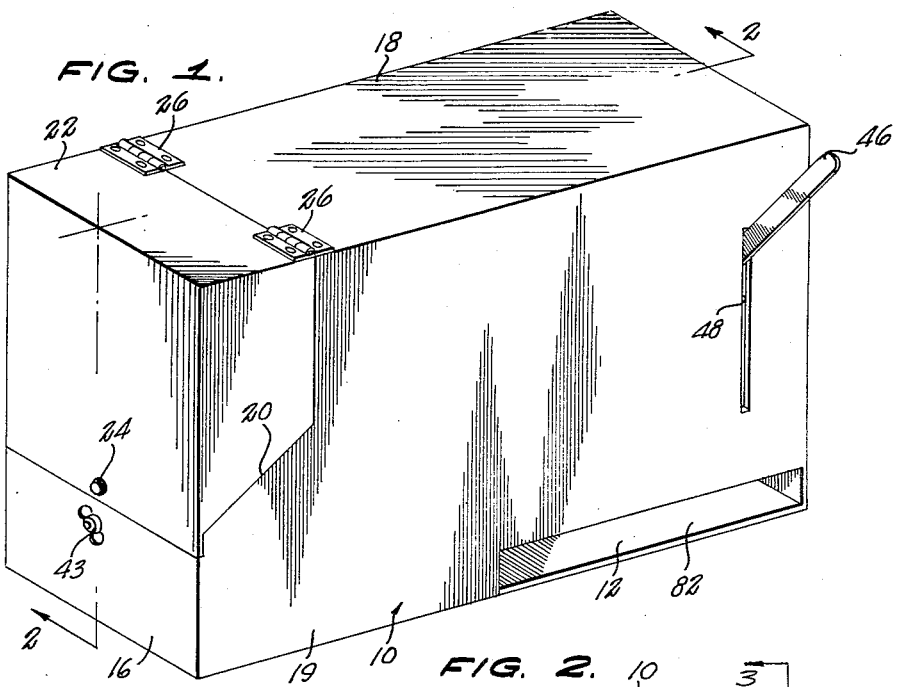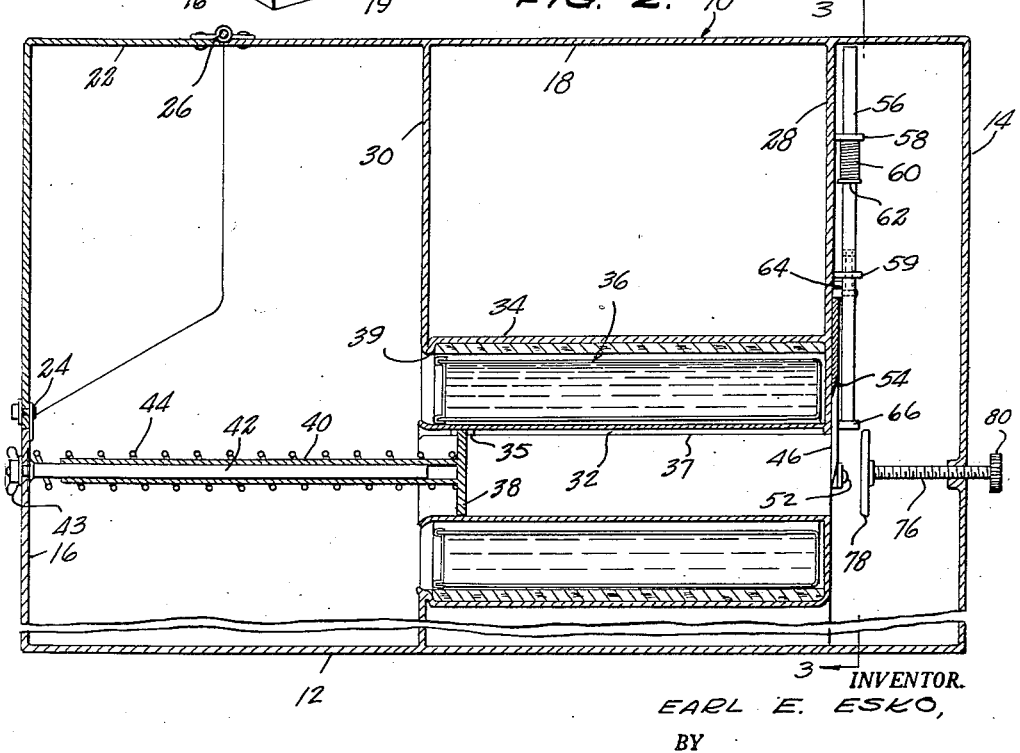

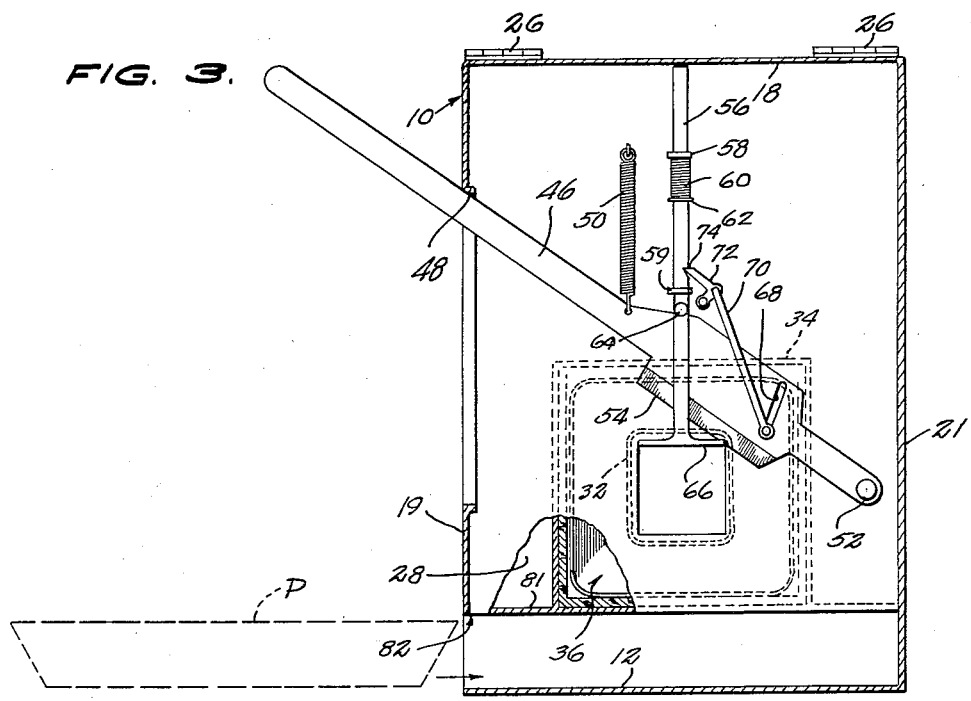
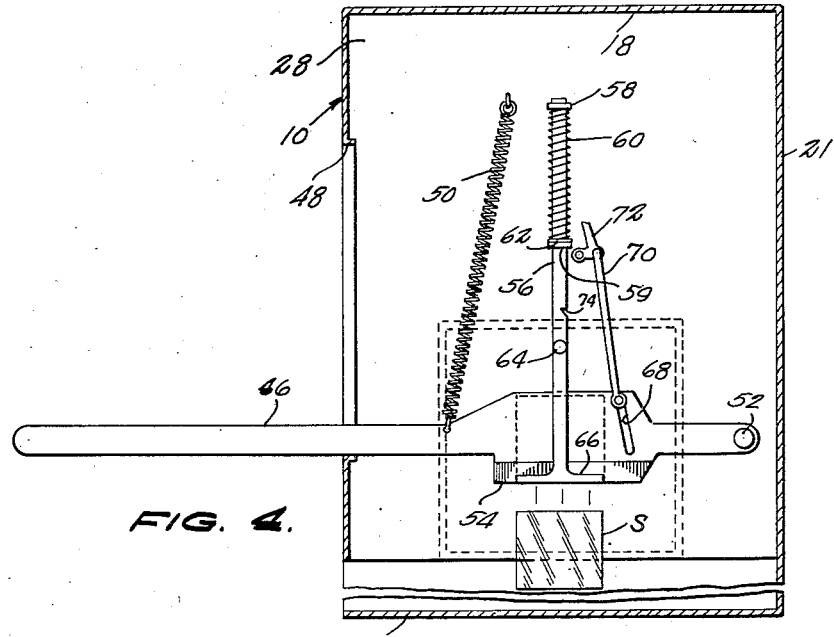

2,799,931

BUTTER SLICING AND DISPENSING DEVICE

Earl E. Esko, Redondo Beach, Calif.

Application December 16, 1955, Serial No. 553,546

5 Claims. (Cl. 31—20)

This invention relates to a device for slicing lengths of butter into pats or individual slices, and for shifting said pats to a receptacle insertable in the device.

One object is to provide a slicer and dispenser for butter that will be particularly adapted for maintaining the butter in a refrigerated condition, while holding the cost of the device to a minimum.

Another object is to provide, in association with a slicing knife, means adapted to release a spring-loaded ejector responsive to travel of the knife across the length of butter, following a predetermined length of movement of the knife, with said means being adapted to eject the pat or slice for movement of the same into a receptacle or plate.

A further object is to so relate the ejector means, the knife, and the means whereby the ejector means is ordinarily kept from shifting to a pat-ejecting position, as to interlock these components on each return movement of the knife to its original or rest position.

A further object is to associate with the cutting mechanism of the device an adjustable abutment for the length of butter, acting in cooperation with a plunger in such a manner as to cause said length to be continually engaged against said abutment for disposition of a predetermined portion of the length in position to be cut.

A further object is to provide an abutment as described which will be readily adjustable selected distances from the cutting knife, thus to correspondingly predetermine the thickness of the pat or slice.

A further object is to provide a device of the character referred to that will be simply designed, compact, will have relatively few movable parts, and will be designed for long life, trouble-free operation, and swift and efficient cutting.

Other objects will appear from the following description, the claims appended thereto, and from the annexed drawing, in which like reference characters designate like parts throughout the several views, and wherein:

Figure 1 is a perspective view of a butter slicer formed according to the present invention;

Figure 2 is an enlarged longitudinal sectional view on line 2—2 of Figure 1, portions being broken away;

Figure 3 is a transverse section on line 3—3 of Figure 2, the knife being shown in its starting or rest position, and a butter-receiving receptacle being shown in dotted lines in position for insertion into the device; and Figure 4 is a view on the same cutting plane as Figure 3 with the knife in its final position.

Referring to the drawings in detail, the device constituting the present invention includes a rectangular casing 10 having a flat, horizontal bottom wall 12, vertical end walls 14, 16 extending upwardly from the opposite ends of the bottom wall, a top wall 18, a front wall 19, and a back wall 21.

At one end, the container is cut away as at 20 to provide an access opening, and said opening is closed by a door 22 normally latched in closed position as at 24, and having a hinge connection 26 to the top wall 18.

Fixedly mounted within the casing are transverse, vertical partitions 28, 30 spaced apart longitudinally of the casing a distance substantially equal to the length of a piece of butter to be cut, such as a quarter pound bar.

Formed in the partitions 28, 30 and aligned longitudinally of the casing are rectangular openings, and extending between the openings is a guideway 32 of rectangular cross section, shaped to receive the length of butter, not shown, that is to be cut by the device.

Also fixedly connected between the partitions 28, 30 and surrounding the guideway, is a jacket 34, defining a continuous space extending about the guideway and disposed over the full length of the guideway. The space is adapted to receive a canister 36 containing a liquefied chemical of a well known type, which chemical when chilled in the freezing compartment of a conventional refrigerator over a predetermined period of time will remain in a chilled condition for a substantial period following removal from the refrigerator. Chemicals of this type are capable of being purchased on the open market, and are packed in containers or canisters which are left in a permanently sealed condition, so as to permit reuse of the chemical an indefinite number of times.

The canister is of externally rectangular cross section over its full length, and has an end-to-end, centrally disposed passage through which the guideway 32 extends, when the canister is inserted in the space between the guideway and jacket from one end of said space, which end is left open as at 39 to permit insertion and removal of the canister.

Formed in the top wall of the guideway is a longitudinal guide slot or track 37, in which is slidably engaged a projection 35 formed upon the top edge of a rectangular pressure plate 38 secured to one end of an elongated tubular member 40. The plate 38 is freely slidable within the guideway, and is adapted to exert pressure against one end of the length of butter, the plate and tubular member defining a plunger telescopically related to a spindle 42 detachably connected at 43 to the adjacent end wall of the casing.

A compression spring 44 is extended about the spindle and tubular member, and is interposed between said end of the casing and the pressure plate 38, so as to exert continuous pressure upon the plunger tending to shift the same longitudinally of the guideway toward the right in Figure 2, whereby to force the length of butter out the other end of the guideway.

A slicing mechanism includes an elongated knife 46 (Figures 3 and 4), one end of which is extended as a handle through a vertical slot 48 formed in the front wall of the casing. The ends of the slot provide abutments limiting swinging movement of the knife in opposite directions as shown in Figures 3 and 4.

A contractile spring 50 is connected between the knife and the partition 28, and normally exerts pull on the knife tending to shift the same to its upper or rest position shown in Figure 3.

The knife is pivoted for swinging movement in a vertical plane upon a pin 52 carried by the partition 28, and intermediate the ends of the knife, the knife is widened and the lower edge thereof is sharpened to provide a cutting blade 54. When the handle is grasped and the knife is swung downwardly about its axis of pivotal movement, the cutting blade traverses the adjacent end of the guideway, with the knife sliding along the face of the partition 28. As a result, when the knife travels from its rest position to its final position shown in Figure 4, a pat or slice S is cut from the projecting end of the length of butter.

A pat of butter so cut tends to adhere to the knife, in some instances, and it is desirable to provide a positive means for ejecting the pat following cutting thereof, so that it will gravitate to a receptacle or plate P inserted in the casing. To this end, there is provided an ejector means that includes a vertical stem 56 disposed in close proximity to the plane of swinging movement of the knife as shown in Figure 2. The stem 56, intermediate its ends, is slidable in guides 58, 59 projecting laterally from and spaced vertically of the partition 28.

A compression coil spring 60 is circumposed about the stem 56, and at one end abuts against the guide 58, the other end of the spring abutting a collar 62 formed upon the stem below guide 58. Thus, the compression spring tends to bias the stem downwardly from its rest or start position shown in Figure 3, to its final or slice-ejecting position shown in Figure 4. Downward movement of the stem is limited by the guide 59 engaging the collar 62.

Formed upon the stem, below guide 59, is a laterally projecting lug 64, and whenever the knife is swung upwardly from its Figure 4 to its Figure 3 position, the top edge of the knife following a predetermined amount of upward movement of the knife, will bear against the lug. The top edge of the knife thus provides a cam surface, acting upon the stem through the medium of the lug to bias the stem vertically, upwardly to its starting position responsive to upward swinging movement of the knife within its vertical plane.

Integral or otherwise made rigid with the stem at the lower end thereof is a cross bar or pusher 66, extending the full width of the guideway and disposed, in the rest position of the ejector stem, substantially coplanar with the top of the guideway. As a result, Whenever the ejector stem is freed for downward movement, it will exert pressure against the cut slice or pat of butter, shifting the same downwardly. The pusher traverses the entire vertical distance of the guideway as will be seen from comparing Figures 3 and 4, during the travel of the ejector stem from its initial to its final positions.

Means is provided for normally latching the ejector stem in its rest position, said means being released from engagement with the stem responsive to downward swinging movement of the knife, after a predetermined part of said swinging movement has occurred. This means includes a detent or pawl, rockable by a link, said link having one end pivotally connected to the knife through a slot 68 formed in the knife and disposed at a slight angle from a line normal to the length of the knife. The link has been designated at 70, and at its other end is pivotally connected to the intermediate portion of an angular detent or pawl 72 rockably mounted on partition 28 adjacent stem 56 and adapted to engage in a notch 74 formed in the stem.

The slot 68 provides a lost motion connection of the link to the knife, and accordingly it will be seen that assuming that the knife is in its starting position with the detent engaged in the notch and the link at the lower end of slot 68, the initial downward movement of the knife will have no effect on the detent.

However, when the knife has travelled downwardly a distance sufficient to substantially fully cut through the length of butter, the knife-connected link end will be at the upper end of slot 68. As a result, the final movement of the knife to its lowest position will exert a downward pull on link 70, and this will cause the detent to be rocked in a clockwise direction about its pivot axis. The detent is thus disengaged from the notch 74, and spring 60 will now be free to expand, to bias the stem to its Figure 4, ejecting position.

When the knife is permitted to return to its initial position under the contractile tendency of spring 50, the stem will be shifted upwardly in the manner previously described. However, until the link 70 arrives at the lower end of the slot 68, the detent will not be rocked back to its stem-engaging position. As the knife approaches its uppermost position, the link 70 will reach the lower end of slot 68 and the final movement of the knife to its starting position will cause the detent to be rocked counterclockwise to engage in notch 74 awaiting the next cutting cycle.

The ejected pat drops to the lower end of the casing, and due to the provision of a horizontal partition 81 spaced above the bottom wall 12, there is provided a space in which a plate P may be inserted, in position to receive the pat. In this connection, the front wall of the casing has at its lower end an elongated, horizontally extending dispensing slot 82 through which the plate may be readily inserted and removed.

Whenever a new length of butter is to be inserted, the plunger is detached from wall 16 by removal of wing nuts 43, and after insertion of the length of butter, the plunger is reattached and will exert pressure on the butter tending to shift the same to the right in Figure 2.

There is provided means for limiting the thickness of the cut slices in an adjustable manner. This includes a threaded stem threadedly engaged in an opening of end wall 13 and having at its inner end a swiveled, disc-like foot 78 disposed in the path of movement of the length of butter out of the guideway 32. It will be seen that the foot can be disposed at any of various selected distances from the knife, and the pat of butter will be formed to a thickness equal to said distances.

On the outer end of the stem there is provided a knurled knob 80 to facilitate rotation of the stem during adjustment of the stop or foot toward or away from the knife.

It will be noted that the length of butter is kept in a chilled condition through the medium of the canister 36 in which the chilling chemical is confined. This provides for an efficient low cost refrigerating means in the device, and of course whenever the canister needs to be rechilled, the plunger is readily removed and the canister is withdrawn for chilling thereof in a refrigerator or the like.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A butter slicer comprising a housing; a guideway therein for a length of butter to be sliced; a spring-loaded plunger extending into one end of the guideway for shifting the length of butter out the other end thereof; a knife pivoted in the housing to shift across said other end of the guideway to cut a slice from said length; a stop mounted in the housing in line with the guideway for adjustment toward and away from said other end of the guideway, thus to limit movement of the butter out of said other end and thereby adjustably determine the thickness of the slice to be cut; and means in the housing actuated responsive to each cutting stroke of the knife to shift the slice out of engagement with the knife and stop, comprising a spring loaded ejector mounted in the housing for straight line movement across said other end of the guideway, a detent pivotally mounted in the housing adjacent the ejector, the ejector having a notch receiving said detent and the detent normally restraining the ejector from said movement when engaged in the notch, the knife having a slot, and a link pivotally connected at one end to the detent and having its other end pivotally connected to the knife within the slot, said slot being arranged to provide a lost motion connection between the knife and link and said link being adapted to rock the detent out of engagement with the ejector following movement of the knife to an extent sufficient to fully sever the slice from the length of butter.

2. A butter slicer comprising a supporting structure; a guideway on said structure adapted for supporting a length of butter, said guideway being open at least at one end for projection of said length beyond said end of the guideway; a knife mounted on the support structure for movement across said end of the guideway between starting and final positions respectively, to cut a pat of butter from the projecting length; ejector means mounted on the support structure for straight line movement transversely of the guideway fully from side to side thereof, said ejector means moving substantially in wiping contact with one side of the knife in a path such as to engage and detach from said side of the knife the pat of butter sliced from said length; detent means normally restraining said ejector means from movement in said path; and means connected between the detent means and knife shifting the detent means out of engagement with the ejector means responsive to movement of the knife to said final position.

3. A butter slicer comprising a supporting structure; a guideway on said structure adapted for supporting a length of butter, said guideway being open at least at one end for projection of said length beyond said end of the guideway; a knife mounted on the support structure for pivotal movement across said end of the guideway between starting and final positions respectively, to cut a pat of butter from the projecting length; ejector means mounted on the support structure for straight line movement transversely of the guideway substantially fully from side to side of the guideway, said ejector means moving substantially in wiping contact with one side of the knife in a path such as to engage and detach from said side of the knife the pat of butter sliced from said length; detent means pivoted on the support structure and normally restraining said ejector means from movement in said path; and a link connected between the detent means and knife, shiftable by the knife on pivoting of the knife to its final position, in a direction to swing the detent means out of engagement with the ejector means.

4. A butter slicer comprising a supporting structure; a guideway on said structure adapted for supporting a length of butter, said guideway being open at least at one end for projection of said length beyond said end of the guideway; a knife mounted on the support structure for pivotal movement across said end of the guideway between starting and final positions respectively, to cut a pat of butter from the projecting length; ejector means mounted on the support structure for straight line movement transversely of the guideway substantially fully from side to side of the guideway, said ejector means moving substantially in wiping contact with one side of the knife in a path such as to engage and detach from said side of the knife the pat of butter sliced from said length; detent means pivoted on the support structure and normally restraining said ejector means from movement in said path; and a link connected between the detent means and knife, shiftable by the knife on pivoting of the knife to its final position, in a direction to swing the detent means out of engagement with the ejector means, said link having a lost motion connection delaying shifting of the link by the knife until the knife has moved substantially the full distance from its starting to its final position.

5. A butter slicer comprising a supporting structure; a guideway on said structure adapted for supporting a length of butter, said guideway being open at least at one end for projection of said length beyond said end of the guideway; a knife mounted on the support structure for pivotal movement across said end of the guideway between starting and final positions respectively, to cut a pat of butter from the projecting length; ejector means including an elongated stem mounted on the support structure for axial movement in a path extending transversely of the guideway, a cross head on the stem shiftable with the stem substantially the full distance from side to side of the guideway on axial movement of the stem in one direction, said cross head being disposed substantially in wiping contact with one side of the knife and moving in a path such as to engage and detach from said side of the knife the pat of butter sliced from said length, the stem being formed with a notch, a spring on the stem tensioned to normally bias the same in said direction, and a stop projecting laterally from the stem engageable by the knife during pivotal movement of the knife from its final to its starting position, for retracting the stem against the restraint of the spring; detent means pivoted on the support structure and normally engaging said notch to restrain the stem from movement in said direction; and a link connected between the detent means and knife and shiftable by the knife, on pivoting of the knife to its final position, in a direction to swing the detent means out of engagement with the stem, said link having a lost motion connection to the knife delaying shifting of the link in said direction thereof, until the knife is approaching its final position after travel substantially the full distance from its starting to its final position.

References Cited in the file of this patent
UNITED STATES PATENTS

| | | |
|---|---|---|
| 1,334,304 | Hodgdon et al. | Mar. 23, 1920 |
| 2,362,722 | Rush et al. | Nov. 14, 1944 |
| 2,488,656 | Berg | Nov. 22, 1949 |
| 2,489,667 | Pennell | Nov. 29, 1949 |
| 2,663,932 | Palazzolo | Dec. 29, 1953 |
| 2,727,306 | Markley et al. | Dec. 20, 1955 |